United States Patent
Choby

(10) Patent No.: US 8,321,112 B2
(45) Date of Patent: Nov. 27, 2012

(54) SYSTEMS AND METHODS FOR ADJUSTING DOWNSHIFT POINTS IN VEHICLE TRANSMISSIONS

(75) Inventor: Jordan Choby, Huntingdon Beach, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 1295 days.

(21) Appl. No.: 12/046,846

(22) Filed: Mar. 12, 2008

(65) Prior Publication Data

US 2009/0233762 A1    Sep. 17, 2009

(51) Int. Cl.
*G06F 7/70* (2006.01)

(52) U.S. Cl. ......................................................... 701/70

(58) Field of Classification Search .................. 701/36, 701/48, 51, 53, 58, 62, 64, 70, 78, 83, 93, 701/95

See application file for complete search history.

(56) References Cited

U.S. PATENT DOCUMENTS

| | | | |
|---|---|---|---|
| 3,934,939 A | 1/1976 | Hida | |
| 5,233,528 A | 8/1993 | Phipps | |
| 5,378,052 A | 1/1995 | Yoshino | |
| 6,164,735 A | 12/2000 | Aizawa et al. | |
| 6,309,031 B1 | 10/2001 | Crombez et al. | |
| 6,895,322 B2 | 5/2005 | Walenty et al. | |
| 7,104,616 B2 | 9/2006 | Zierolf | |
| 2001/0016795 A1* | 8/2001 | Bellinger | 701/53 |
| 2005/0272560 A1 | 12/2005 | Doering et al. | |
| 2005/0278106 A1 | 12/2005 | Simon, Jr. et al. | |
| 2007/0090691 A1 | 4/2007 | Maskell | |

* cited by examiner

*Primary Examiner* — Kim T Nguyen
(74) *Attorney, Agent, or Firm* — Dinsmore & Shohl LLP

(57) ABSTRACT

A method for adjusting downshift points of a vehicle transmission to assist vehicle braking in a vehicle having a brake system with a brake master cylinder and a brake pedal for actuating the brake system may comprise determining if the brake pedal is pressed. When the brake pedal is pressed, an intended brake effort may be determined and the actual deceleration of the vehicle may be calculated. A threshold deceleration for the intended brake effort may then be determined and compared to the vehicle deceleration. When the vehicle deceleration is less than the threshold deceleration for the intended braking effort a downshift point of the transmission may be adjusted. Thereafter the transmission may be downshifted using the adjusted downshift point.

20 Claims, 4 Drawing Sheets

SYSTEMS AND METHODS FOR ADJUSTING DOWNSHIFT POINTS IN VEHICLE TRANSMISSIONS

TECHNICAL FIELD

The present invention generally relates to systems and methods for controlling transmission shifting and, more specifically, to methods and systems for adjusting downshift points of a vehicle transmission to assist vehicle braking.

BACKGROUND

Automatic transmission control logic may be utilized to match one of a plurality of transmission gear ratios to the operation of the vehicle intended by the driver, such as acceleration or braking, to improve the driving experience. For example, automatic transmission control logic may be used to supplement or assist the brake system of the vehicle with engine braking. Engine braking may be facilitated by reducing the gear ratio of the transmission by downshifting the transmission as the vehicle decelerates. In addition to matching the transmission gear ratio to the intended vehicle operation, transmission control logic may also be used to account for certain road and/or driving conditions such as road grade, vehicle load, weather conditions and the like when the vehicle is accelerating or braking. Current transmission control logic estimates braking efforts based on vehicle deceleration levels to determine downshift aggressiveness which, in turn, is used to modify transmission downshift points. However, when a load is added to the vehicle the deceleration characteristics of the vehicle may change and, as a result, the same brake effort will not produce the same deceleration. Current transmission control logic has a major flaw in that the logic fails to account for applied loads and the change in the deceleration characteristics of the vehicle that result.

Accordingly, a method and system for adjusting the downshift points of a vehicle transmission to assist in vehicle braking is needed which accounts for increased vehicle loads.

SUMMARY

In one embodiment, a method for adjusting downshift points of a vehicle transmission to assist vehicle braking in a vehicle having a brake system with a brake master cylinder and a brake pedal for actuating the brake system may comprise determining if the brake pedal is pressed. When the brake pedal is pressed, an intended brake effort may be determined and the actual deceleration of the vehicle may be calculated. A threshold deceleration for the intended brake effort may then be determined and compared to the actual deceleration. When the vehicle deceleration is less than the threshold deceleration for the intended braking effort a downshift point of the transmission may be adjusted. Thereafter the transmission may be downshifted using the adjusted downshift point.

In another embodiment, a method of supplementing the brake system of a vehicle with engine braking by adjusting downshift points of the vehicle transmission in a vehicle having a brake system with a brake master cylinder and a brake pedal for actuating the brake system may comprise determining if the brake pedal is pressed. If the brake pedal is pressed, the presence of preemptory conditions may be determined. Such preemptory conditions may indicate that downshifting the vehicle may create undesirable operating conditions. If preemptory conditions are not present, an intended brake effort may be determined from the pressure in the brake master cylinder when the brake pedal is pressed. An actual deceleration of the vehicle may then be determined based on a change in speed of the vehicle when the brake pedal is pressed and compared to a threshold deceleration for the intended braking effort. When the vehicle deceleration is less than a predetermined percentage of the threshold deceleration for the intended braking effort a downshift point of the transmission may be adjusted. Thereafter the transmission may be downshifted using the adjusted downshift point.

In another embodiment, a vehicle control system for adjusting the downshift points of a vehicle transmission to assist with vehicle braking in a vehicle having a brake system with a master cylinder and a brake pedal for actuating the system may comprise a brake master cylinder pressure sensor operatively coupled to the brake master cylinder. The brake master cylinder pressure sensor may output a signal indicative of the pressure of the brake master cylinder. The control system may also include brake pedal position sensor operatively coupled to the brake pedal. The brake pedal position sensor may output a signal indicating whether the brake pedal is pressed or released. Transmission speed sensors may be operatively coupled to the transmission such that the output of the transmission speed sensors is indicative of the input speed and the output speed of the transmission. The transmission speed sensors may also be used to determined the gear ratio of the transmission. The control system may also include a controller operatively connected to the transmission of the vehicle, the brake master cylinder pressure sensor, the brake pedal position sensor, and the transmission speed sensor such that the controller receives output signals from the transmission, the brake master cylinder pressure sensor, the brake pedal position sensor and the transmission speed sensor. The controller may be programmed to: determine if the brake pedal is pressed or released; determine an intended brake effort based on the pressure in the brake master cylinder when the brake pedal is pressed; determine the actual deceleration of the vehicle when the brake pedal is pressed; determine a threshold deceleration for the intended brake effort; compare the vehicle deceleration with the threshold deceleration; adjust a downshift point of the transmission when the actual deceleration is less than a predetermined percentage of the threshold deceleration; and downshift the transmission using the adjusted downshift point.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings where like structure is indicated with like reference numerals and in which:

DETAILED DESCRIPTION OF THE ILLUSTRATIVE EMBODIMENTS

Figure 1:
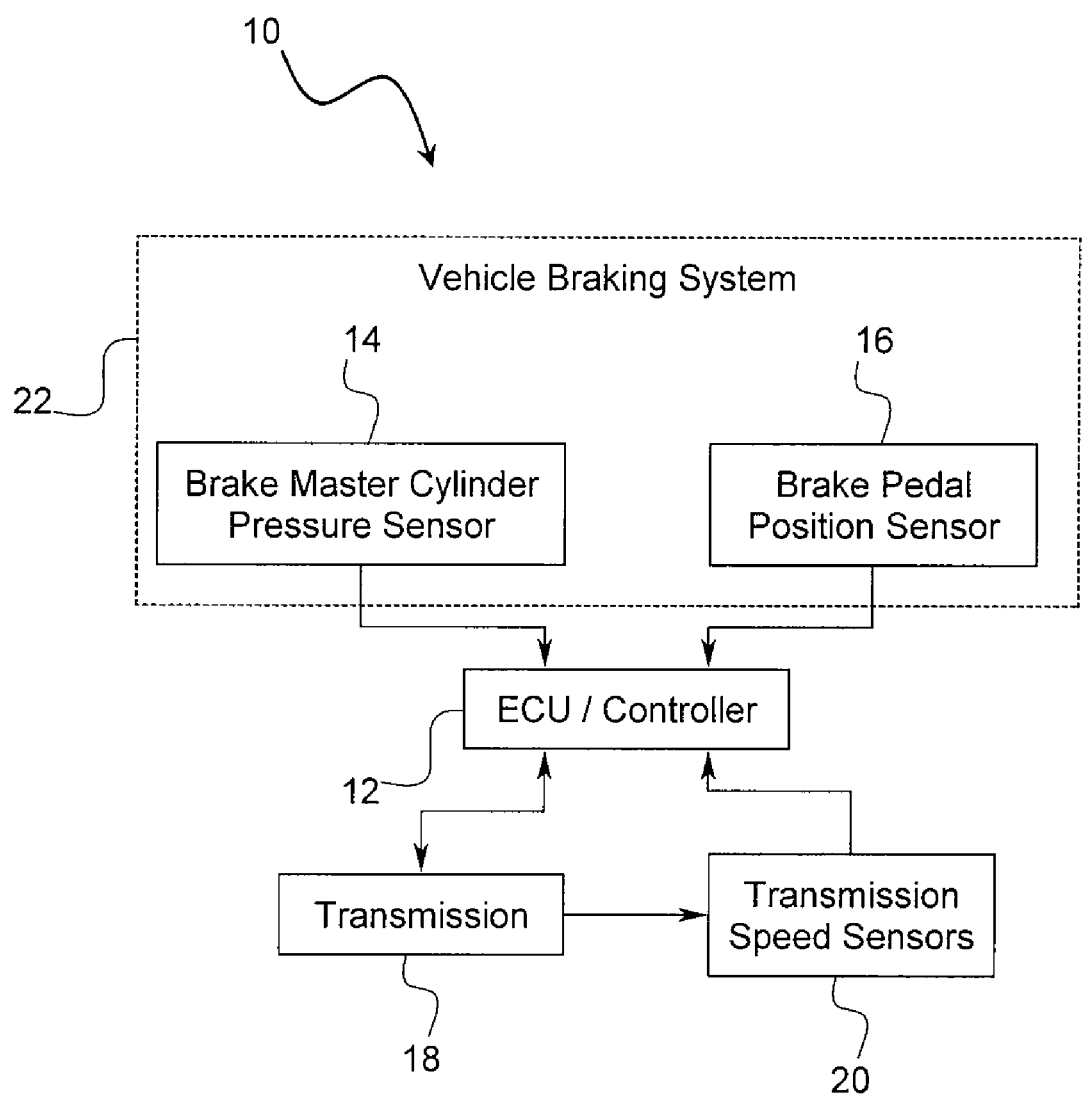
FIG. 1 is a schematic diagram depicting a system for adjusting downshifts of a vehicle transmission according to one embodiment shown and described herein.

FIG. 1 generally depicts a system for carrying out the method of adjusting the downshift points of a vehicle transmission to assist vehicle braking according to one embodiment described herein. The systems and methods adjust the downshift points of the transmission to assist in vehicle braking when the actual vehicle deceleration is less than the deceleration intended by the driver. The system for adjusting the downshift points of a vehicle transmission to assist vehicle braking may generally comprise a controller or electronic control unit (ECU), a vehicle brake system having a brake master cylinder pressure sensor and a brake pedal position sensor, a transmission and transmission speed sensors. Each of these elements and the operation of the system will be described in more detail herein.

Referring now to FIG. 1, an embodiment of a system 10 for adjusting downshift points of a vehicle transmission to assist vehicle braking is shown. The system 10 may include a stand-alone logic controller such as an electronic control unit (ECU) 12 or similar controller. In one embodiment, the ECU 12 may consist of a plurality of discrete controllers interconnected with one another. In another embodiment, the ECU 12 may be integral with another controller or a control unit. In yet another embodiment, the ECU 12 may comprise memory for receiving and storing information collected during the operation of the vehicle. The ECU 12 may be operatively connected to the vehicle braking system 22. More specifically, the ECU 12 may be operatively connected to the brake master cylinder pressure sensor 14 and the brake pedal position sensor 16 of the vehicle braking system 22.

The brake pedal position sensor 16 may be operatively coupled to the brake pedal (not shown) of the vehicle. In one embodiment, the brake pedal position sensor 16 may be a two position pressure switch that indicates brake engagement or disengagement. In another embodiment, the brake pedal position sensor 16 may be a pressure sensor that provides an indication of the desired brake effort based on the pressure applied to the brake pedal. It should be understood that the brake pedal position sensor 16 may be any type of sensor suitable for determining if the vehicle braking system is engaged or disengaged as will be apparent to one skilled in the art.

The brake master cylinder pressure sensor 14 may be operatively coupled to the master cylinder of the vehicle braking system. In one embodiment, the brake master cylinder pressure sensor may be a pressure transducer located in the master cylinder fluid reservoir. The output signal of the brake master cylinder pressure sensor corresponds to the pressure generated by the master cylinder which, in turn, corresponds to the driver's desired or intended brake effort. In another embodiment, the signal received by the ECU 12 from the brake master cylinder pressure transducer 14 may be mathematically smoothed when received by the ECU 12. While specific reference is made herein to the brake master cylinder pressure sensor 14 being a pressure transducer positioned in the master cylinder fluid reservoir, it should be understood that the brake master cylinder pressure sensor may be any type of sensor suitable for measuring pressure. Further, the brake master cylinder pressure sensor may be coupled to the master cylinder in any manner as may be known in the art such that the output of the brake master cylinder pressure sensor 14 is indicative of the driver's intended brake effort.

As shown in FIG. 1, the ECU 12 may also be operatively connected to the transmission 18 of the vehicle. The ECU 12 may be programmed to send and receive signals to and from the transmission 18 thereby facilitating control of the transmission 18. For example, the transmission may be equipped with sensors which provide output signals to the ECU 12 related to the status of the transmission such as the speed of the transmission and the present gear ratio of the transmission. In one embodiment, the transmission may be equipped with an output speed sensor connected to the output shaft of the transmission and an input speed sensor connected to the input shaft of the transmission. The difference in the output speed of the transmission and the input speed of the transmission, as determined by the ECU 12 from the signals of the input and output speed sensors, may be used to determine the gear ratio of the transmission. The ECU 12 may be programmed to control the gear ratio of the transmission 18 and to adjust the gear ratio of the transmission 18 by up shifting or downshifting the transmission 18 based on signals received from the transmission speed sensors 20.

The ECU 12 may also be operatively connected to a speed sensor which provides the ECU 12 with a signal indicative of the speed of the vehicle. In one embodiment, the speed sensor may be operatively connected to the transmission 18 of the vehicle, such as when the speed sensor is a transmission speed sensor 20 as shown in FIG. 1. For example, the transmission speed sensor 20 may be connected to the output shaft (not shown) of the transmission 18 which drives the wheels of the vehicle. Accordingly, the output signal of the transmission speed sensor 20 may directly correspond to the speed of the vehicle. However, it should be understood that the speed sensor may be operatively associated with any drive train, transmission or engine component of the vehicle such that the output of the speed sensor is representative of the speed of the vehicle, as will be apparent to one skilled in the art. For example, in one embodiment, the speed sensor may be operatively associated with a wheel of the vehicle such that the output of the speed sensor is indicative of the speed of the wheel of the vehicle. Based on the output of the speed sensor, the ECU 12 may determine the speed of the vehicle.

It should be understood that the arrows showing the interconnectivity of the various components of the system 10 in FIG. 1 are also indicative of signals relayed to and from the ECU 12 by the various components of the system 10.

Moreover, it should be understood that, while specific reference is made herein to geared vehicle transmissions, the systems and methods described herein may be applicable to any of a variety of vehicle transmission types. For example, the systems and methods used herein may be used in conjunction with geared transmissions, belt and pulley transmissions, electronic transmissions and the like, where changing the gearing ratios, the pulley ratios, electronic controls and the like may assist the braking system in decelerating the vehicle by engine or motor braking. Further, it should be understood that the methods and systems described herein may be used in conjunction with automatic transmissions, automated manual transmissions, continuously variable transmissions, infinitely variable transmissions, electric motors and the like.

In the embodiment of the system 10 for adjusting downshift points in vehicle transmissions to assist in vehicle braking shown in FIG. 1, the ECU 12 may be programmed to determine if the brake pedal of the vehicle is pressed such that the vehicle braking system is engaged. If the brake pedal is pressed, the ECU may be programmed to determine if certain conditions are present, such as excessive vehicle speed, vehicle instability, the current transmission gear ratio and the like, each of which may preempt adjusting the downshift points of the transmission to assist in vehicle braking. If no preemptive conditions are present, the ECU 12 may be programmed to determine the pressure in the master cylinder of the brake system as a measure of the driver's intended brake effort. The ECU 12 may also be programmed to determine the actual deceleration of the vehicle and compare the vehicle deceleration with a known or calculated threshold deceleration corresponding to the intended brake effort. The ECU 12 may then be programmed to aggressively adjust the downshift point of the vehicle transmission based on this comparison thereby assisting in braking the vehicle. The method used by the ECU 12 to adjust the downshift points of the transmission to assist in vehicle braking will now be described in further detail.

Figure 2:
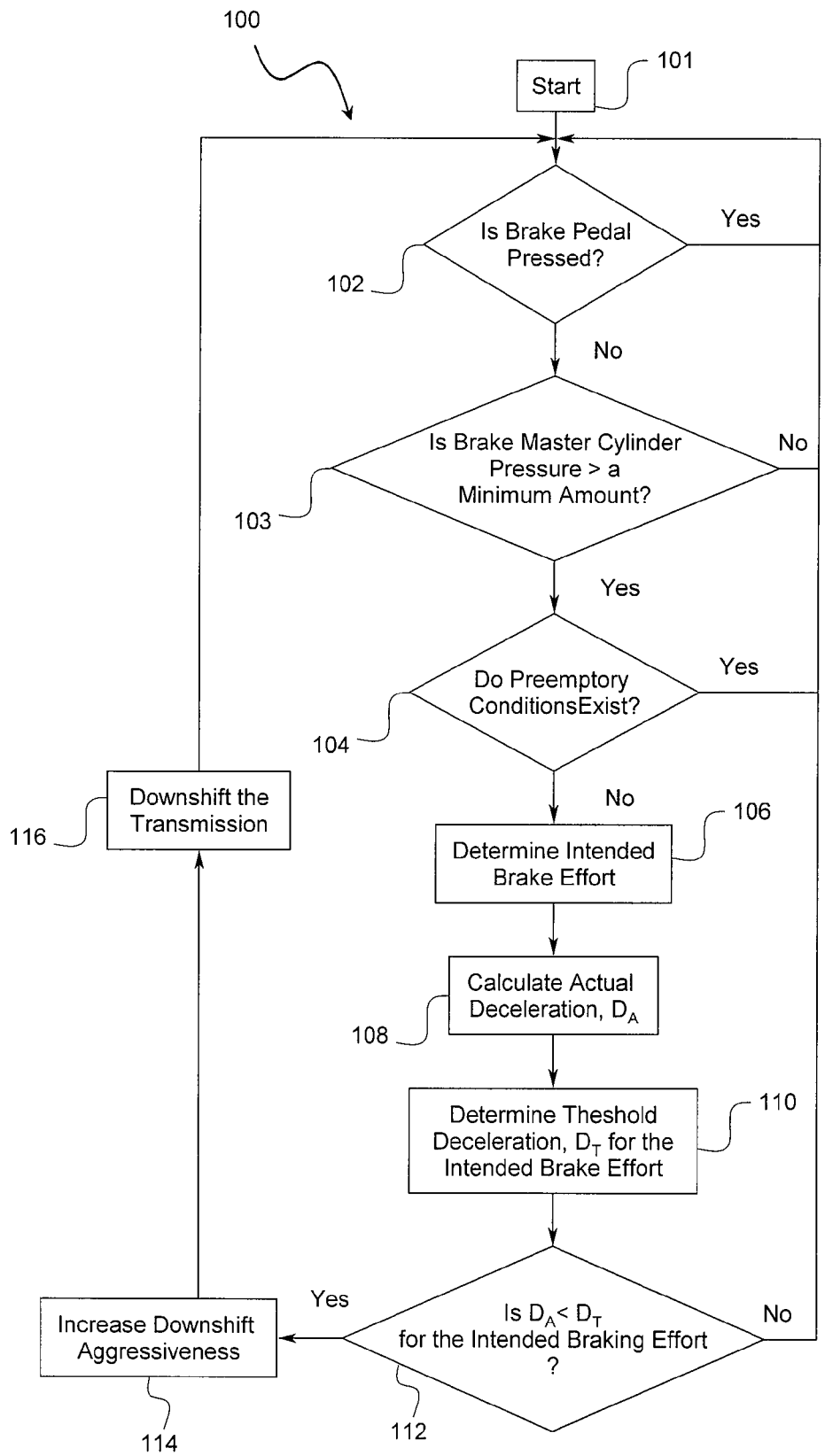
FIG. 2 is a flow diagram of a method for adjusting downshifts of a vehicle transmission according to one embodiment shown and described herein.
Figure 3:
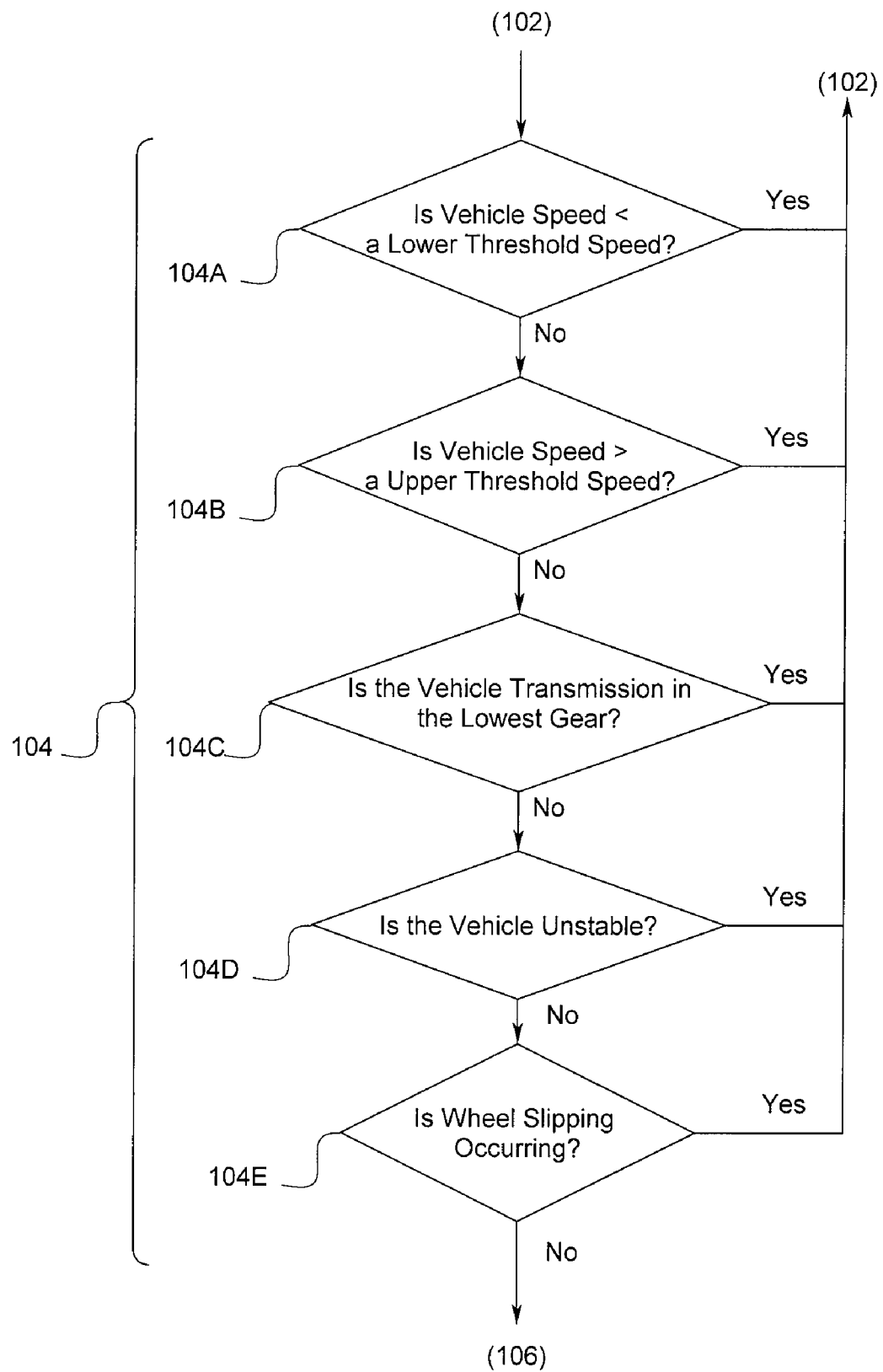
FIG. 3 is a flow diagram of method steps for determining if preemptory conditions exist when performing the method of adjusting downshifts of a vehicle transmission according to one embodiment shown and described herein.
Figure 4:
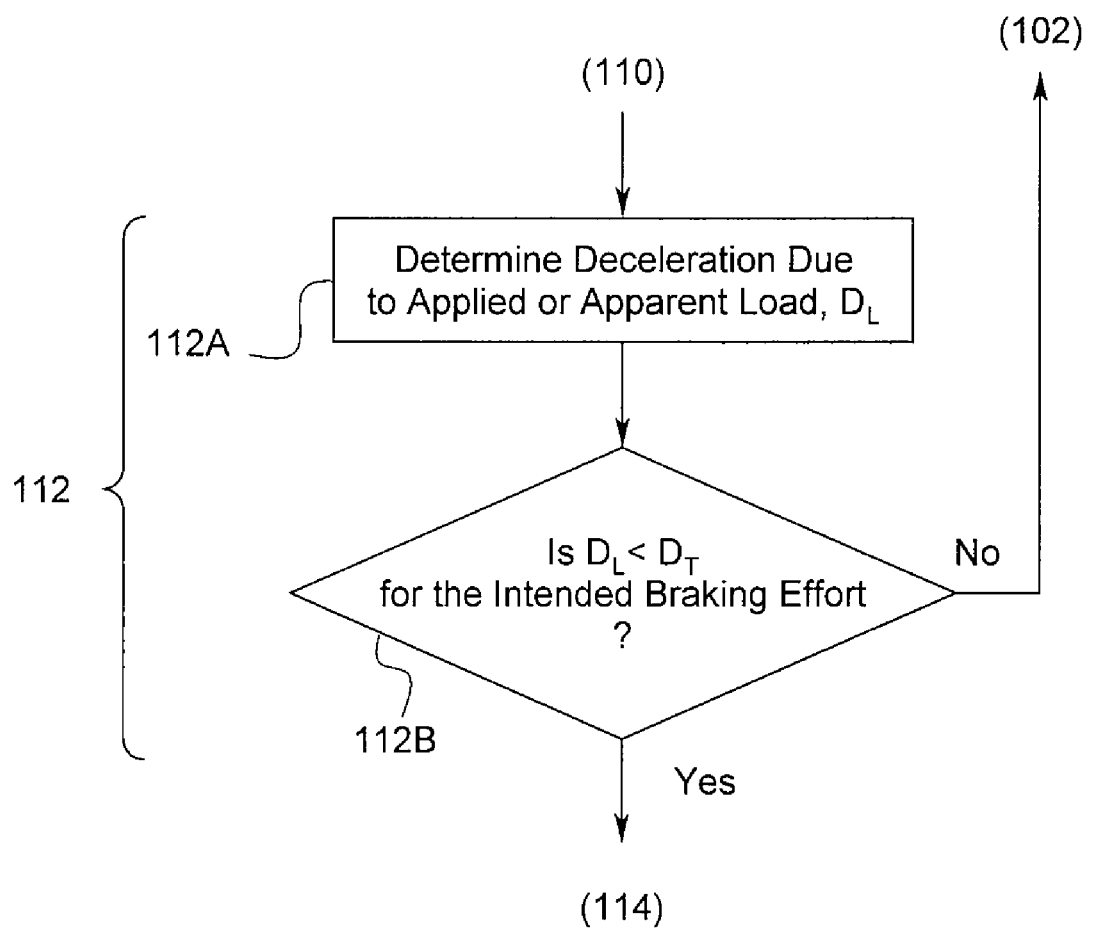
FIG. 4 is a flow diagram of method steps for determining if the deceleration of the vehicle due to an applied or apparent load is less than the threshold deceleration for adjusting downshifts of a vehicle transmission according to one embodiment shown and described herein.

Referring now to FIGS. 2-4, a flow diagram of a method 100 to adjust the downshift points of a vehicle transmission to assist vehicle braking is shown. The method 100 may be included as a logic loop in a vehicle controller such as the ECU 12 depicted in FIG. 1. The method 100 may be triggered when the vehicle ignition is switched to the "on" position and may terminate when the vehicle ignition is switched to the "off" position. The method 100 may begin with step 101 wherein certain variables (e.g., intended brake effort, actual deceleration ($D_A$), threshold deceleration ($D_T$) and the like) may be initialized. In step 102 the position of the brake pedal is determined. In one embodiment, the position of the brake pedal (e.g., pressed or released) may be determined based on the output signal of the brake pedal position sensor to the ECU. If the brake pedal is pressed such that the vehicle braking system is engaged, the method may proceed to step 103. If the brake pedal of the vehicle is not pressed, step 102 may be repeated.

In step 103 the brake master cylinder pressure is determined from the brake master cylinder pressure sensor. If the brake master cylinder pressure is above a predetermined amount the method may proceed to step 104. If the brake master cylinder pressure is below a predetermined amount, the method returns to step 102 and is repeated.

In step 104 one or more preemptory conditions may be evaluated to determine if adjusting the vehicle downshift point is advisable given the operating conditions of the vehicle or if adjusting the vehicle downshift point may create a dangerous operating condition. If no preemptory conditions exist, the method may proceed to step 106. If preemptory conditions are present, the method may loop back to step 102 and repeat.

In one embodiment, step 104 may include steps 104A, 104B, 104C, 104D, and 104E as shown in FIG. 3. In step 104A the vehicle speed may be determined from a speed sensor such as the transmission speed sensor or a similar speed sensor. The vehicle speed is then compared to a lower threshold speed. The lower threshold speed defines a minimum speed for which a transmission downshift may be performed. Accordingly, if the vehicle speed is less than the lower threshold speed, then the method returns to step 102 and is repeated. If the vehicle speed is greater than the threshold speed, the method proceeds to step 104B. In step 104B the vehicle speed is compared to an upper threshold speed. The upper threshold speed defines a maximum speed for which a transmission downshift may be safely performed. Accordingly, if the vehicle speed is less than the upper threshold speed, the method may proceed to step 104C. If the vehicle speed is greater than the upper threshold speed adjusting the downshift point of the transmission may create a dangerous condition and the method loops back to step 102. It should be understood that each gear ratio of the transmission may have an associated upper threshold speed and, therefore, the step of determining if the upper threshold speed has been exceeded may include determining the present gear ratio of the transmission prior to comparing the speed of the vehicle to the upper threshold speed.

In step 104C, the present gear ratio of the transmission (e.g., which gear the transmission is in) may be determined. If the transmission is in the lowest gear ratio (e.g., the lowest gear), no further downshifting is possible to assist vehicle braking. Accordingly, the method loops back to step 102 and repeats. In one embodiment, the lowest gear may be a predetermined gear ratio other than the actual lowest gear ratio. For example, downshifting to first or second gear from a higher gear may be too aggressive and may cause unsafe operating conditions. Accordingly, the lowest gear may be determined to be third gear or another, higher gear ratio instead of the actual lowest gear ratio. When the transmission is not in the specified lowest gear ratio, downshifting the transmission may be used to assist in vehicle braking and the method proceeds to the step 104D.

In step 104D the stability of the vehicle may be determined. In one embodiment, the stability of the vehicle may be determined by monitoring the lateral attitude of the vehicle with respect to horizontal. If the attitude of the vehicle is greater than a predetermined maximum angle, the vehicle may be in an unstable position which may create a dangerous driving condition if the vehicle were downshifted. Accordingly, the method returns to step 102 and is repeated. In another embodiment, the stability of the vehicle may be determined based on the operation of vehicle systems. For example, the active operation of a stability control system may be indicative of instability. Accordingly, if the vehicle is unstable, the method returns to step 102 and repeats. If the vehicle is stable, the method continues on to step 104E.

In step 104E wheel slippage may determined. In one embodiment, the stability of the vehicle may be determined by measuring the speed of each wheel of the vehicle. If the speed of one or more wheels is different than the remaining wheels, such as when one or more wheels is slipping, an unstable condition may be present due to road conditions or the mechanical condition of the vehicle. In another embodiment, the stability of the vehicle may be determined based on the operation of vehicle systems. For example, the active operation of a traction control system may be indicative of instability. Accordingly, if one or more of the wheels is slipping, the method returns to step 102 and repeats. If no wheel slippage occurs, the method continues on to the next subsequent step in the method.

It should be understood that steps 104A, 104B, 104C, 104D and 104E may be performed in any order and that no particular limitation is intended by the order of steps shown in FIG. 3. Moreover, it should be understood that other preemptory conditions, in addition to or in place of those shown in FIG. 3, may be evaluated in step 104 including, without limitation, the angle of declination and inclination of the vehicle (front to back), the lateral position of the vehicle, the road conditions, vehicle drift and the like.

If no preemptory conditions exist, the method may proceed to step 106 where the driver's intended brake effort may be determined. In one embodiment, the intended brake effort may be determined from the brake pedal position sensor operatively coupled to the brake pedal. The output of the sensor may be indicative of the pressure applied to the brake pedal by the driver to engage the braking system of the vehicle. In another embodiment, the intended brake effort may be determined from the brake master cylinder pressure sensor operatively coupled to the master cylinder of the vehicle braking system. In yet another embodiment, the signal from the brake master cylinder pressure sensor may be received by the ECU and mathematically smoothed by the ECU. In both embodiments the output of the brake master cylinder pressure sensor and/or the position of the brake pedal may be indicative of the hydraulic pressure applied by the master cylinder to the vehicle braking system as a result of the brake pedal being pressed by the driver. Accordingly, the brake master cylinder pressure or the position of the brake pedal may also be indicative of the driver's intended brake effort.

After the intended brake effort is determined, the actual deceleration ($D_A$) of the vehicle due to the application of the vehicle braking system may be determined in step 108. The actual deceleration of the vehicle may be determined by monitoring the speed of the vehicle over time and calculating the deceleration based on the observed decrease in speed. In one embodiment, the actual deceleration of the vehicle may be determined by monitoring the output signal of the transmission speed sensor and calculating the deceleration of the vehicle based on the output of the transmission speed sensor. For example, the output signal of the transmission speed sensor may be monitored over a specific time interval and the actual deceleration is calculated by dividing the change in the speed of transmission by the time interval. In another embodiment, the actual deceleration of the vehicle may be determined by monitoring the speed of the output shaft of the transmission using a transmission speed sensor.

In step 110 a threshold deceleration ($D_T$) may be determined for the intended brake effort. In one embodiment, the threshold deceleration may be determined from a look-up table (LUT) of predetermined deceleration values indexed according to the transmission gear ratio and the intended braking effort. The LUT may include a separate LUT for each of a plurality of transmission gear ratios as may be commonly found in a vehicle transmission. In one embodiment, the LUT may be stored in the memory of the ECU, such as when the method of adjusting the downshifts of a vehicle transmission is performed by a controller or ECU. The threshold deceleration may be indicative of the minimum deceleration for a given braking effort corresponding to safe operation of the vehicle.

It should now be understood that the step of determining the actual rate of deceleration (step 106) and the step of determining the threshold deceleration (step 108) may be performed in any order. Accordingly, no particular limitation is intended as to the order of steps 106 and 108 as depicted in FIG. 2.

In a next step 112, the vehicle deceleration is compared to a threshold deceleration for the intended braking effort to determine if the downshift of the transmission should be adjusted. The vehicle deceleration may be the actual deceleration of the vehicle, as determined in step 108, or the deceleration of the vehicle due to an applied or apparent load as determined from the actual deceleration which will be discussed further herein. In one embodiment, when the vehicle deceleration is the actual deceleration, the actual deceleration is compared to the threshold deceleration for the intended braking effort and current transmission gear ratio. When the actual deceleration is greater than the threshold deceleration for the intended braking effort and current transmission gear ratio, the vehicle is decelerating within safe and/or normal operating parameters and no further braking assistance is required. Under these conditions the vehicle transmission may be downshifted according to the standard transmission control logic where downshifts occur at predetermined points based on the speed of the vehicle. If the actual deceleration is greater than the threshold deceleration, the method returns to step 102 and is repeated.

However, when the actual deceleration is less than the threshold deceleration for the intended braking effort and current transmission gear ratio, the vehicle deceleration may be outside of safe and/or normal operating parameters and braking assistance beyond the driver's brake effort may be required. Several conditions may cause the actual deceleration to be less than the threshold deceleration for the intended brake effort and current transmission gearing. For example, $D_A < D_T$ may be indicative of a malfunction with the vehicle braking system. In another example, $D_A < D_T$ may indicate that the vehicle is hauling an actual load (e.g., carrying a load in a cargo area of the vehicle) or towing a load (e.g., towing a loaded trailer) and, therefore, additional braking assistance may be needed. In yet another example, $D_A < D_T$ may indicate that the vehicle is descending a hill (with or without a load) and, due to the grade of the hill, additional braking assistance may be needed. Under such circumstances the angle of declination of the vehicle on the hill may represent an apparent load on the vehicle which, in turn, may adversely effect vehicle deceleration for a given intended brake effort. Whatever the causal circumstance, $D_A < D_T$ for a given intended brake effort and transmission gear ratio indicates that additional braking assistance may be needed. Accordingly, when $D_A < D_T$, the method proceeds to step 114 where the transmission downshift points may be adjusted to provide engine braking and thereby assist in vehicle braking.

In another embodiment, an actual or apparent load on the vehicle may be accounted for in step 112. In one embodiment, a vehicle having an applied load may still operate within the safe or normal vehicle operating parameters so long as the actual deceleration of the vehicle is within a certain, predetermined percentage of the threshold deceleration. For example, the method may proceed to step 114 when $D_A < 0.9 * D_T$. In another example, the method may proceed to step 114 when $D_A < 0.8 * D_T$. It should be understood that the percentage of the threshold deceleration for which safe operation may occur may vary for each gear ratio of the transmission. It should also be understood that the percentage of the threshold deceleration for which safe vehicle operation occurs may vary from vehicle to vehicle according to the loading and braking characteristics of the vehicle.

In another embodiment, when the vehicle deceleration is the deceleration of the vehicle due to an applied or apparent load, step 112 may comprise comparing the deceleration of the vehicle due to an applied load ($D_L$) to the threshold deceleration ($D_T$) as shown in FIG. 4. For example, step 112 may comprise steps 112A and 112B. In step 112A $D_L$ is determined by determining the difference between the actual deceleration of the vehicle ($D_A$) to the base deceleration ($D_B$) for the intended brake effort. In one embodiment, a value for $D_B$ may be determined from an LUT correlating deceleration to intended brake effort as measured by the position of the brake pedal or the brake master cylinder pressure for the vehicle when the vehicle is unloaded. Accordingly, the difference between the actual deceleration of the vehicle and the base deceleration of the vehicle yields the deceleration of the vehicle due to the applied or apparent load on the vehicle or $D_L$. In step 112B, $D_B$ is compared to the threshold deceleration ($D_T$) for the intended brake effort and current transmission gear ratio. If $D_L$ is greater than $D_T$, then the method 100 returns to step 102 and is repeated. If $D_L$ is less than $D_T$, then the method proceeds to step 114.

In step 114 the downshift point of the transmission may be adjusted to compensate for the reduced deceleration and thereby assist with vehicle braking. Under normal operating conditions, such as when the deceleration of the vehicle is greater than the threshold deceleration as determined in step 112, the transmission of the vehicle may be downshifted using the standard transmission control logic where downshifts occur at predetermined points based on the speed of the vehicle. However, when the vehicle deceleration is less than the threshold deceleration, the downshift point of the transmission may be adjusted such that the transmission is downshifted more aggressively (e.g., the transmission is downshifted sooner than required by the standard transmission control logic) so as to assist with vehicle braking by increasing engine braking. Accordingly, in step 114, downshift aggressiveness is increased which, in turn, results in the transmission being downshifted earlier thereby providing the vehicle with braking assistance in the form of engine braking as a result of the reduced gear ratio of the transmission. Thereafter, the method continues to step 116 where the transmission is downshifted using the adjusted transmission downshift point. The method then returns to step 102 and is repeated.

It should now be understood that the methods and systems shown and described herein may be used in conjunction with any transmission wherein changing gear ratios, pulley ratios, motor controls and the like may provide engine or motor braking and assist the vehicle braking system in decelerating the vehicle. Accordingly, the methods described herein may be used in conjunction with automatic transmissions, automated manual transmissions, continuously variable transmissions, infinitely variable transmissions, electric motors and the like. Moreover, it should also be understood that the systems and methods shown and described herein take into account the relationship between intended braking and the load on the vehicle (e.g., the actual load being hauled or towed by the vehicle and/or the apparent load on the vehicle such as when the vehicle is descending an incline) by comparing the actual deceleration to a threshold deceleration for the vehicle. The methods and systems described herein may be easily incorporated into current vehicle designs using existing hardware and sensors already present in the vehicles. Accordingly, the methods and systems described herein may be introduced into vehicles without significant additional expense or effort.

Moreover, the methods and systems shown and described herein provide a software-based solution for controlling the transmission of the vehicle and assisting in vehicle braking by adjusting the transmission downshift points by measuring the driver's intended braking effort and actual deceleration. The methods and systems are capable of controlling and adjusting transmission downshift points without user input or control. Accordingly, the risk of operator error is avoided. Further, because the methods and systems are implemented through a continuous software loop, the system response is both fast and automatic resulting in safer and more convenient vehicle operation on hills and grades and/or when the vehicle is hauling or towing a load.

While particular embodiments and aspects of the present invention have been illustrated and described herein, various other changes and modifications can be made without departing from the spirit and scope of the invention. Moreover, although various invented aspects have been described herein, such aspects need not be utilized in combination. It is therefore intended that the appended claims cover all such changes and modifications that are within the scope of this invention.

What is claimed is:

1. A method for adjusting downshift points of a vehicle transmission using a controller to assist vehicle braking, wherein the vehicle includes a brake system having a brake master cylinder and a brake pedal for actuating the brake system, the method comprising:
   determining if the brake pedal is pressed using the controller;
   determining an intended brake effort when the brake pedal is pressed using a sensor, the sensor providing an input to the controller when the brake pedal is pressed;
   calculating an actual deceleration of the vehicle when the brake pedal is pressed;
   determining a threshold deceleration for the intended brake effort determined using the input;
   comparing a vehicle deceleration to the threshold deceleration for the intended brake effort;
   adjusting a downshift point of the transmission when the vehicle deceleration is less than the threshold deceleration for the intended brake effort; and
   downshifting the transmission using the adjusted downshift point.

2. The method of claim 1 wherein the intended brake effort is determined by measuring pressure in the brake master cylinder when the brake pedal is pressed.

3. The method of claim 1 wherein the intended brake effort is determined from a position of the brake pedal when the brake pedal is pressed.

4. The method of claim 1 wherein the threshold deceleration for the intended brake effort is determined from a look-up table of predetermined deceleration values indexed according to gear ratios of the transmission and the intended brake effort.

5. The method of claim 1 wherein the threshold deceleration for the intended brake effort is determined from a plurality of look-up tables comprising predetermined deceleration values indexed according to intended brake effort for each of a plurality of transmission gear ratios.

6. The method of claim 1 wherein the vehicle deceleration is the actual deceleration of the vehicle or a deceleration of the vehicle due to an applied or apparent load.

7. The method of claim 1 further comprising determining if preemptory conditions exist that may create undesirable operating conditions if the transmission is downshifted.

8. The method of claim 1 wherein the actual deceleration of the vehicle is calculated based on a change in speed of the transmission.

9. The method of claim 1 wherein the downshift point of the transmission is adjusted to be more aggressive.

10. A method of supplementing the brake system of a vehicle with engine braking by adjusting downshift points of the vehicle transmission using a controller, wherein the vehicle includes a brake system having a brake master cylinder and a brake pedal for actuating the brake system, the method comprising:
    determining if the brake pedal is pressed using the controller;
    determining if preemptory conditions are present that would create undesirable operating conditions if the transmission is downshifted;
    determining an intended brake effort based on pressures in the brake master cylinder when the brake pedal is pressed using a pressure sensor providing an input to the controller indicative of the pressures in the brake master cylinder;

determining an actual deceleration of the vehicle based on a change in speed of the vehicle when the brake pedal is pressed;

determining a threshold deceleration for the intended brake effort determined using the input and the controller;

comparing a vehicle deceleration to the threshold deceleration;

adjusting a downshift point of the transmission when the vehicle deceleration is less than a predetermined percentage of the threshold deceleration; and downshifting the transmission using the adjusted downshift point.

11. The method of claim 10 wherein the change in speed of the vehicle is determined based on a change in speed of the transmission.

12. The method of claim 11 wherein the change in speed of the transmission is determined based on a change in speed of an output shaft of the transmission.

13. The method of claim 10 wherein the vehicle deceleration is the actual deceleration of the vehicle or a deceleration of the vehicle due to an applied or apparent load.

14. The method of claim 10 wherein the threshold deceleration for the intended braking effort is determined from a look-up table of predetermined deceleration values indexed according to gear ratios of the transmission and the intended brake effort.

15. The method of claim 10 wherein the downshift point of the transmission is adjusted when the vehicle deceleration is less than about 100 percent of the threshold deceleration.

16. A vehicle control system for adjusting the downshift points of the vehicle transmission to assist with vehicle braking, wherein the vehicle includes a brake system having a brake master cylinder and a brake pedal for actuating the brake system, the control system comprising:

a brake master cylinder pressure sensor operatively coupled to the brake master cylinder wherein the brake master cylinder pressure sensor outputs a signal indicative of the pressure in the brake master cylinder;

a brake pedal position sensor operatively coupled to the brake pedal wherein the brake pedal position sensor outputs a signal indicating whether the brake pedal is pressed or released;

a transmission speed sensor operatively coupled to the transmission wherein the transmission speed sensor outputs a signal indicative of the speed of the transmission; and a controller, wherein the controller is operatively connected to the transmission of the vehicle, the brake master cylinder pressure sensor, the brake pedal position sensor, and the transmission speed sensor such that the controller receives output signals from the transmission, the brake master cylinder pressure sensor, the brake pedal position sensor and the transmission speed sensor and wherein the controller is programmed to:

cooperate with the brake pedal position sensor to determine if the brake pedal is pressed or released;

cooperate with the brake master cylinder pressure sensor to determine an intended brake effort when the brake pedal is pressed;

cooperate with the transmission speed sensor to determine an actual deceleration of the vehicle when the brake pedal is pressed;

determine a threshold deceleration for the intended brake effort determined using the master cylinder pressure sensor;

compare a vehicle deceleration with the threshold deceleration;

adjust a downshift point of the transmission when the vehicle deceleration is less than a predetermined percentage of the threshold deceleration;

downshift the transmission using the adjusted downshift point.

17. The vehicle control system of claim 16 wherein the threshold deceleration is determined from a look-up table of predetermined deceleration values indexed according to gear ratios of the transmission and the intended brake effort and wherein the look-up table is stored in a memory of the controller.

18. The vehicle control system of claim 16 wherein the vehicle deceleration is the actual deceleration of the vehicle or a deceleration of the vehicle due to an applied or apparent load.

19. The vehicle control system of claim 16 wherein the downshift point of the transmission is adjusted when the vehicle deceleration is less than about 100 percent of the threshold deceleration.

20. The vehicle control system of claim 16 wherein the controller is further programmed to determine if preemptory conditions are present which would create undesirable operating conditions if the transmission is downshifted.

* * * * *